US011333579B2

(12) United States Patent
Ueda et al.

(10) Patent No.: US 11,333,579 B2
(45) Date of Patent: May 17, 2022

(54) RIM CHANGE DEVICE, TIRE TEST DEVICE, AND RIM REPLACEMENT METHOD

(71) Applicants:MITSUBISHI HEAVY INDUSTRIES MACHINERY SYSTEMS, LTD., Kobe (JP); BRIDGESTONE CORPORATION, Tokyo (JP)

(72) Inventors: Tatsuya Ueda, Kobe (JP); Jiro Agawa, Kobe (JP); Makoto Tachibana, Kobe (JP)

(73) Assignees: MITSUBISHI HEAVY INDUSTRIES MACHINERY SYSTEMS, LTD., Kobe (JP); BRIDGESTONE CORPORATION, Tokyo (JP)

( * ) Notice: Subject to any disclaimer, the term of this patent is extended or adjusted under 35 U.S.C. 154(b) by 164 days.

(21) Appl. No.: 16/970,426

(22) PCT Filed: Feb. 21, 2018

(86) PCT No.: PCT/JP2018/006176
§ 371 (c)(1),
(2) Date: Aug. 17, 2020

(87) PCT Pub. No.: WO2019/163016
PCT Pub. Date: Aug. 29, 2019

(65) Prior Publication Data
US 2021/0088415 A1 Mar. 25, 2021

(51) Int. Cl.
*G01M 17/02* (2006.01)
(52) U.S. Cl.
CPC ........ *G01M 17/021* (2013.01); *G01M 17/022* (2013.01)

(58) Field of Classification Search
CPC .......................... G01M 17/021; G01M 17/022
See application file for complete search history.

(56) References Cited

U.S. PATENT DOCUMENTS

| 4,971,128 A | 11/1990 | Koga et al. |
| 9,261,434 B2 | 2/2016 | Wollbrinck et al. |
| (Continued) | | |

FOREIGN PATENT DOCUMENTS

| JP | H01-155234 A | 6/1989 |
| JP | H01-192532 A | 8/1989 |
| | (Continued) | |

OTHER PUBLICATIONS

PCT/ISA/210, "International Search Report for International Application No. PCT/JP2018/006176," dated May 29, 2018.
(Continued)

*Primary Examiner* — Eric S. McCall
*Assistant Examiner* — Timothy P Graves
(74) *Attorney, Agent, or Firm* — Manabu Kanesaka; Benjamin Hauptman; Kenneth Berner

(57) ABSTRACT

A first carrying arm (64) and a second carrying arm (65) provided in a first post (61) and a third carrying arm (73) and a fourth carrying arm (74) provided in a second post (62) are provided, the first carrying arm (64) is turned in a direction following the third carrying arm (73) from a side opposite to a side on which the third carrying arm (73) collecting an upper rim turns to carry another upper rim to an upper spindle, and the second carrying arm (65) is turned in a direction following the fourth carrying arm (74) from a side opposite to a side on which the fourth carrying arm (74) collecting a lower rim turns to carry another lower rim to a lower spindle.

11 Claims, 8 Drawing Sheets

(56) References Cited

U.S. PATENT DOCUMENTS

| | | | |
|---|---|---|---|
| 2013/0233067 A1* | 9/2013 | Wollbrinck | G01M 17/02 |
| | | | 73/146 |
| 2014/0054365 A1 | 2/2014 | Tachibana et al. | |
| 2014/0060181 A1* | 3/2014 | Tachibana | B60C 19/00 |
| | | | 73/460 |
| 2014/0069180 A1 | 3/2014 | Ueda et al. | |
| 2015/0185113 A1 | 7/2015 | Tachibana et al. | |

FOREIGN PATENT DOCUMENTS

| | | | | |
|---|---|---|---|---|
| JP | H05-000657 A | 1/1993 | | |
| JP | 5313943 B2 | 10/2013 | | |
| JP | 5752012 B2 | 7/2015 | | |
| JP | 5752057 B2 | 7/2015 | | |
| JP | 5863467 B2 | 2/2016 | | |
| WO | 2012/063281 A1 | 5/2012 | | |
| WO | WO-2012063281 A * | 5/2012 | | G01M 17/021 |

OTHER PUBLICATIONS

PCT/ISA/237, "Written Opinion of the International Searching Authority for International Application No. PCT/JP2018/006176," dated May 29, 2018.

* cited by examiner

RIM CHANGE DEVICE, TIRE TEST DEVICE, AND RIM REPLACEMENT METHOD

RELATED APPLICATIONS

The present application is National Phase of International Application No. PCT/JP2018/006176 filed Feb. 21, 2018, the disclosure of which is hereby incorporated by reference herein in its entirety.

TECHNICAL FIELD

The present invention relates to a rim change device, a tire test device, and a rim replacement method.

BACKGROUND ART

In a process of manufacturing a tire, various inspections are performed after a vulcanization process. As an inspection system for inspecting a tire after the vulcanization process, for example, a tire uniformity machine for measuring non-uniformity of the tire, a dynamic balancing machine for measuring unbalance of the tire, or the like is known.

In a case of a tire test device such as the tire uniformity machine or the dynamic balancing machine, the tire is rotated in a state where the tire is held using a tire holding mechanism and the tire is inspected. In this case, the tire is fixed in a state where the tire is interposed between an upper rim attached to an upper spindle and a lower rim attached to a lower spindle.

Meanwhile, there are a plurality of types of tires. Therefore, it is necessary to replace the upper rim attached to the upper spindle and the lower rim attached to the lower spindle according to a tire to be inspected.

Patent Document 1 discloses a tire uniformity machine including a rim change device which includes an upper rim storage unit which is disposed in a ring shape above an upper spindle, a first upper rim replacement unit which collects an upper rim from one direction with respect to the upper spindle, and a second upper rim replacement unit which carries the upper rim stored in the upper rim storage unit to the upper spindle with respect to the upper spindle from another direction intersecting the one direction.

CITATION LIST

Patent Literature

[Patent Document 1]
PCT International Publication No. WO2012/063281

SUMMARY OF INVENTION

Technical Problem

As described above, in Patent Document 1, another upper rim is carried to the upper spindle from another direction intersecting the direction (one direction) of collecting the upper rim attached to the upper spindle. Therefore, from the viewpoint of avoiding collision between the upper rims, it is difficult to carry another upper rim from the other direction to the upper spindle unless most of the upper rim is carried from the upper spindle in one direction.

For this reason, it is difficult to further reduce a time required for rim replacement.

Therefore, an object of the present invention is to provide a rim change device, a tire test device, and a rim replacement method which can further reduce replacement times of the upper rim and the lower rim.

Solution to Problem

In order to achieve the object, according to an aspect of the present invention, there is provided a rim change device including: a tire holding mechanism which includes an upper spindle supporting an upper rim from above and a lower spindle disposed below the upper spindle and rotatable supporting a lower rim, and holds a tire between the upper rim and the lower rim; a rim storage in which a plurality of different types of upper rims and a plurality of different types of lower rims are stored; and a rim carrying mechanism which is disposed between the tire holding mechanism and the rim storage, in which the rim carrying mechanism includes a first post which extends in an up-down direction, a first carrying arm which is provided in the first post in a state of being movable in the up-down direction, is configured to turn about an axis of the first post, is configured to carry the upper rim selected from the rim storage to the upper spindle, and mounts the upper rim on the upper spindle, a second carrying arm which is provided in the first post in a state of being movable in the up-down direction, turns about the axis of the first post, is configured to carry the lower rim selected from the rim storage to the lower spindle, and mounts the lower rim on the lower spindle, a second post which extends in the up-down direction and is provided at a position adjacent to the first post, a third carrying arm which is provided in the second post in a state of being movable in the up-down direction, turns about the second post, is configured to carry the upper rim collected from the upper spindle, and stores the upper rim in the rim storage, and a fourth carrying arm which is provided in the second post in a state of being movable in the up-down direction, turns about the second post, is configured to carry the lower rim collected from the lower spindle, and stores the lower rim in the rim storage. The first carrying arm is configured to carry another upper rim to the upper spindle after the upper rim is collected, by being configured to turn in a direction following the third carrying arm from a side opposite to a side on which the third carrying arm turns. The second carrying arm is configured to carry another lower rim to the lower spindle after the lower rim is collected, by being configured to turn in a direction following the fourth carrying arm from a side opposite to a side on which the fourth carrying arm turns.

According to the present invention, the rim change device includes the first carrying arm which is configured to carry the upper rim selected from the rim storage to the upper spindle and the third carrying arm which is configured to carry the upper rim collected from the upper spindle and stores the upper rim in the rim storage, and the first carrying arm turns in the direction following the third carrying arm from the side opposite to the side on which the third carrying arm turns after the upper rim is collected to carry another upper rim to the upper spindle. Accordingly, it is possible to carry another upper rim to the upper spindle at the same timing as a start of the turning of the upper rim collected from the upper spindle. Thereby, it is possible to further reduce the replacement time of the upper rim.

Moreover, the rim change device includes the second carrying arm which is configured to carry the lower rim selected from the rim storage to the lower spindle and the fourth carrying arm which is configured to carry the lower rim collected from the lower spindle and stores the lower rim in the rim storage, and the second carrying arm turns in the direction following the fourth carrying arm from the side opposite to the side on which the fourth carrying arm turns after the lower rim is collected to carry another lower rim to the lower spindle. Accordingly, it is possible to carry another lower rim to the lower spindle at the same timing as a start of the turning of the lower rim collected from the lower spindle. Thereby, it is possible to further reduce the replacement time of the lower rim.

Moreover, in the rim change device according to the aspect of the present invention, the rim storage may store the plurality of different types of upper rims and the plurality of different types of lower rims in the up-down direction, and the plurality of different types of lower rims may be disposed below the plurality of different types of upper rims.

Accordingly, compared to a case where the plurality of upper rims and the plurality of lower rims are stored to be arranged in a plane, by storing the plurality of different types of upper rims and the plurality of different types of lower rims in the up-down direction, it is possible to reduce an installation area of the rim storage for storing the plurality of upper rims and the plurality of lower rims.

Further, in the rim change device according to the aspect of the present invention, the first post and the second post may be disposed to face each other in a direction orthogonal to a straight line connecting a center axis of the rim storage and center axes of the upper spindle and the lower spindle to each other.

As described above, the first post and the second post are disposed in the direction orthogonal to the straight line which connects the center axis of the rim storage and the center axes of the upper spindle and the lower spindle to each other. Accordingly, the first carrying arm can be turned in the direction following the third carrying arm from the side opposite to the side on which the third carrying arm turns after the upper rim is collected, and the second carrying arm can be turned in the direction following the fourth carrying arm from the side opposite to the side on which the fourth carrying arm turns after the lower rim is collected.

Further, in the rim change device according to the aspect of the present invention, the second carrying arm may be disposed at a position overlapping the first carrying arm in the up-down direction, the fourth carrying arm may be disposed at a position overlapping the third carrying arm in the up-down direction, and the rim change device may further include: a first turning unit which is configured to turn the first carrying arm and the second carrying arm at the same timing and in the same direction; a first elevating unit which is configured to raise or lower the first carrying arm in the up-down direction; a second elevating unit which is configured to raise or lower the second carrying arm in the up-down direction; a second turning unit which is configured to turn the third carrying arm and the fourth carrying arm at the same timing and in the same direction; a third elevating unit which is configured to raise or lower the third carrying arm in the up-down direction; and a fourth elevating unit which is configured to raise or lower the fourth carrying arm in the up-down direction.

The first and second turning units having the configurations are provided, and thus, it is possible to simultaneously collect the upper rim and the lower rim and carry the upper rim and the lower rim. Therefore, it is possible to further reduce replacement times of the upper rim and the lower rim.

In addition, the first to fourth elevating units are provided, and thus, it possible to independently move the first to fourth carrying arms in the up-down direction.

Further, in the rim change device according to the aspect of the present invention, each of the plurality of upper rims may have a first flange portion, each of the plurality of lower rims may have a second flange portion, each of the first carrying arm and the third carrying arm may have a C shape and include an upper rim support portion in which a first support groove inside which the first flange portion is placed is formed, each of the second carrying arm and the fourth carrying arm may have a C shape and include a lower rim support portion in which a second support groove inside which the second flange portion is placed is formed, the upper rim support portion of the first carrying arm may be open on a side from the rim storage toward the upper spindle, the lower rim support portion of the second carrying arm may be open on a side from the rim storage toward the lower spindle, the upper rim support portion of the third carrying arm may be open on a side from the rim storage toward the upper spindle, and the lower rim support portion of the fourth carrying arm may be open on a side from the rim storage toward the lower spindle.

As described above, each of the first carrying arm and the third carrying arm has a C shape and includes the upper rim support portion in which the first support groove inside which the first flange portion of the upper rim is placed is formed, and the opening of the upper rim support portion is formed on the side from the rim storage toward the upper spindle. Accordingly, the first and third carrying arms are turned in the same direction, and thus, after an interference between the first carrying arm and the third carrying arm is suppressed, the upper rim can be collected from the upper spindle and the upper rim stored in the rim storage can be carried to the upper spindle.

Moreover, each of the second carrying arm and the fourth carrying arm has a C shape and includes the lower rim support portion in which the second support groove inside which the second flange portion of the lower rim is placed is formed, and the opening of the lower rim support portion is formed on the side from the lower spindle toward the rim storage. Accordingly, after an interference between the second carrying arm and the fourth carrying arm is suppressed, the lower rim can be collected from the lower spindle and the lower rim stored in the rim storage can be carried to the lower spindle.

Further, in the rim change device according to the aspect of the present invention, a first gap through which the first carrying arm and the third carrying arm pass may be formed between at least two of the plurality of upper rims which are stored in the rim storage and disposed in the up-down direction, and a second gap through which the second carrying arm and the fourth carrying arm pass may be formed between at least two of the plurality of lower rims which are stored in the rim storage and disposed in the up-down direction.

As described above, the first gap through which the first carrying arm can pass is formed between at least two upper rims of the plurality of upper rims disposed in the up-down direction. Accordingly, after the first carrying arm passes through the first gap, the upper rim stored in the rim storage is supported by the C-shaped upper rim support portion, and the upper rim can be turned and carried in the direction from the rim storage toward the upper spindle.

Moreover, the first gap through which the third carrying arm can pass is formed, and thus, after the third carrying arm having the C-shaped upper rim support portion stores the upper rim in the rim storage, the third carrying arm which does not support the upper rim passes through the first gap. Accordingly, the third carrying arm can move to a portion between the rim storage and the upper spindle.

Further, the second gap through which the second carrying arm can pass is formed between at least two lower rims of the plurality of lower rims disposed in the up-down direction. Accordingly, after the second carrying arm passes through the second gap, the lower rim stored in the rim storage is supported by the C-shaped lower rim support portion, and the lower rim can be turned and carried in the direction from the rim storage toward the lower spindle.

Moreover, the second gap through which the fourth carrying arm can pass is formed, and thus, after the fourth carrying arm having the C-shaped lower rim support portion stores the lower rim in the rim storage, the fourth carrying arm which does not support the lower rim passes through the second gap. Accordingly, the fourth carrying arm can move to a portion between the rim storage and the lower spindle.

Moreover, in the rim change device according to the aspect of the present invention, the rim storage may include a support plate which extends in the up-down direction, a plurality of upper rim support tables which are provided on a side of the support plate facing the tire holding mechanism, are disposed at intervals in the up-down direction, and support the upper rim, a plurality of lower rim support tables which are provided on the side of the support plate facing the tire holding mechanism, are disposed at intervals in the up-down direction, and support the lower rim, and a turning shaft which is provided on one end of the support plate and is configured to turn the support plate.

According to this configuration, the plurality of upper rim support tables and the plurality of lower rim support tables together with the support plate can be turned about the turning shaft.

Accordingly, the rim carrying mechanism disposed between the tire holding mechanism and the rim storage does not hinder replacement works of the upper rim and the lower rim stored in the rim storage. Therefore, the replacement works of the upper rim and the lower rim stored in the rim storage can be easily performed.

Further, according to another aspect of the present invention, there is provided a tire test device including: the rim change device; and a measurement unit which is configured to measure characteristics of the tire held between the upper rim and the lower rim.

As described above, the tire test device includes the rim change device, and thus, it is possible to reduce times for collecting the upper rim from the upper spindle and carrying the upper rim to the upper spindle and times for collecting the lower rim from the lower spindle and carrying the lower rim to the lower spindle. Accordingly, it is possible to reduce a time required for measuring the characteristics of the tire including the replacement times of the upper rim and the lower rim.

In order to achieve the object, according to still another aspect, there is provided a rim replacement method using first and second carrying arms which are provided in a first post and is configured to turn about the first post and third and fourth carrying arms which are provided in a second post and turn about the second post, the method including: an upper rim replacement step of moving the third carrying arm below an upper spindle after supporting an upper rim mounted on the upper spindle by the third carrying arm, and thereafter, when the third carrying arm is turned in a direction toward a rim storage, turning and moving the first carrying arm supporting another upper rim in the rim storage to follow the turning third carrying arm and moving the other upper rim below the upper spindle; and a lower rim replacement step of moving the fourth carrying arm above a lower spindle after supporting a lower rim mounted on the lower spindle by the fourth carrying arm, and thereafter, when the fourth carrying arm is turned in a direction toward the rim storage, turning and moving the second carrying arm supporting another lower rim in the rim storage to follow the turning fourth carrying arm and moving the other lower rim above the lower spindle, in the upper rim replacement step, the first carrying arm is configured to carry the other upper rim below the upper spindle in conjunction with retreating of the third carrying arm supporting the upper rim from below the upper spindle, and in the lower rim replacement step, the second carrying arm is configured to carry the other lower rim above the lower spindle in conjunction with retreating of the fourth carrying arm supporting the lower rim from above the lower spindle.

As described above, in the upper rim replacement step, in the upper rim replacement step, the first carrying arm is configured to carry another upper rim below the upper spindle in conjunction with the retreating of the third carrying arm supporting the upper rim from below the upper spindle. Accordingly, the carrying of another upper rim below the upper spindle can start at the same time as the retreat start of the upper rim to be replaced. Thereby, it is possible to further reduce the replacement time of the upper rim.

In addition, in the lower rim replacement step, the second carrying arm is configured to carry another lower rim above the lower spindle in conjunction with the retreating of the fourth carrying arm supporting the lower rim from above the lower spindle. Accordingly, the carrying of another lower rim above the lower spindle can start at the same time as the retreat start of the lower rim to be replaced. Thereby, it is possible to further reduce the replacement time of the lower rim.

Further, in the rim replacement method according to the aspect of the present invention, the first carrying arm may remain stationary near the upper spindle in a state where the first carrying arm supports the other upper rim in a stage before the third carrying arm retreats, and wherein the second carrying arm may remain stationary near the lower spindle in a state where the second carrying arm supports the other lower rim in a stage before the fourth carrying arm retreats.

As described above, in a stage before the third carrying arm is retreated, the first carrying arm supporting another upper rim remains stationary near the upper spindle. Accordingly, when the third carrying arm starts retreating, another upper rim can be quickly carried below the upper spindle. Thereby, it is possible to further reduce the replacement time of the upper rim.

In addition, in a stage before the fourth carrying arm is retreated, the second carrying arm supporting another lower rim remains stationary near the lower spindle. Accordingly, when the fourth carrying arm starts retreating, another lower rim can be quickly carried above the lower spindle. Thereby, it is possible to further reduce the replacement time of the lower rim.

Further, in the rim replacement method according to the aspect of the present invention, the first carrying arm and the second carrying arm may turn and be raised or lowered such that the first carrying arm and the second carrying arm overlap each other in an up-down direction in which the upper spindle and the lower spindle face each other, and the third carrying arm and the fourth carrying arm may turn and be raised or lowered such that the third carrying arm and the fourth carrying arm overlap each other in the up-down direction.

As described above, the first and second carrying arms are turned and are raised or lowered so as to overlap each other in the up-down direction, and the third and fourth carrying arms are turned and are raised or lowered so as to overlap each other in the up-down direction. Accordingly, the upper rim and the lower rim can be replaced at the same time. Thereby, it is possible to further reduce the replacement times of the upper rim and the lower rim.

Advantageous Effects of Invention

According to the present invention, it is possible to further reduce the replacement times of the upper rim and the lower rim.

DESCRIPTION OF EMBODIMENTS

Hereinafter, embodiments to which the present invention is applied will be described in detail with reference to the drawings.

Embodiment

A tire test device 10 according to an embodiment of the present invention will be described with reference to FIGS. 1 to 5. A structure including a rim storage 17 and a rim carrying mechanism 18 shown in FIG. 1 corresponds to a cross-sectional view taken along line $B_1$-$B_2$ of the structure including the rim storage 17 and the rim carrying mechanism 18 shown in FIG. 2.

Figure 1:
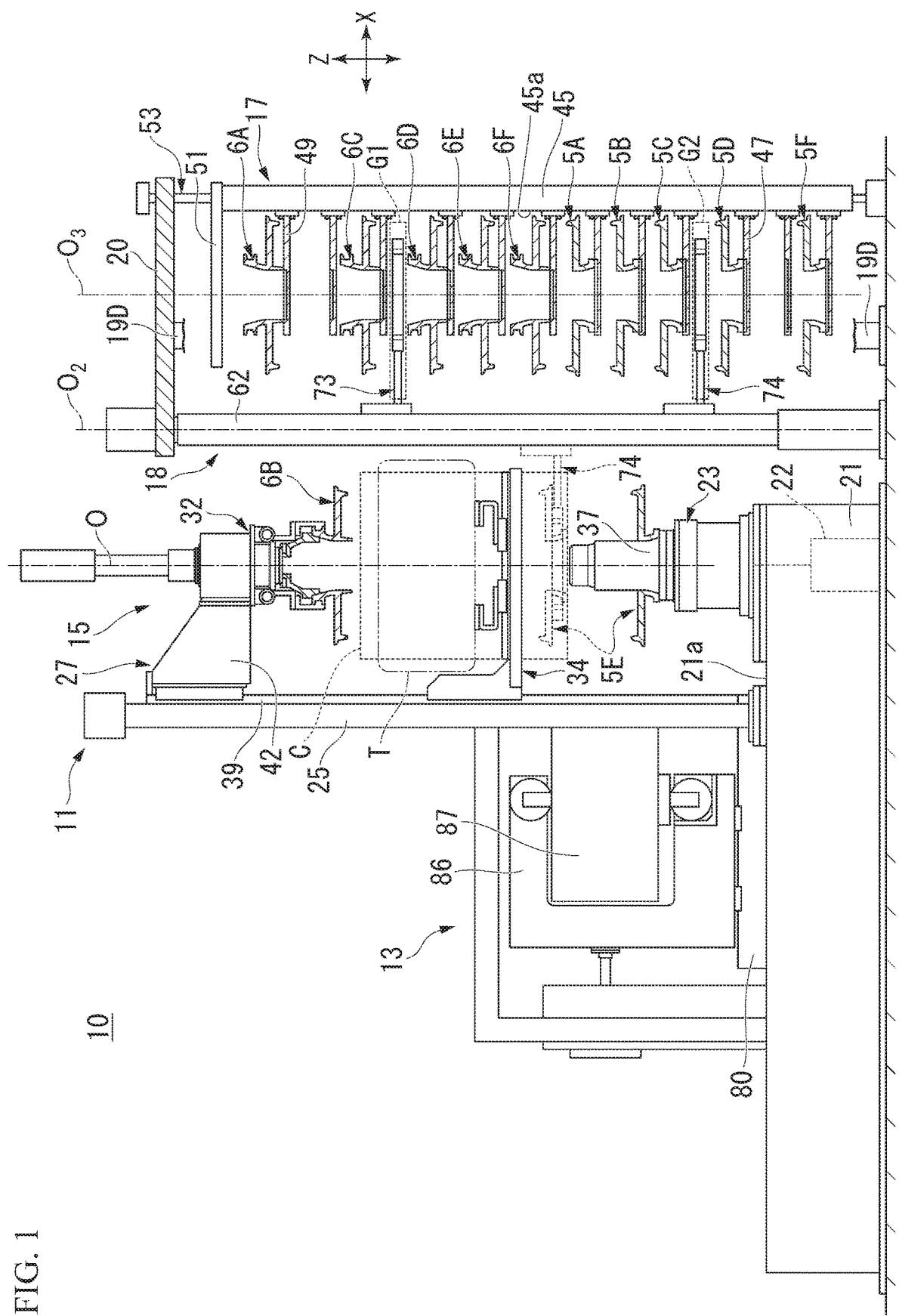
FIG. 1 is a side view showing a schematic configuration of a tire test device according to an embodiment of the present invention.

In FIG. 1, as an example, among different types of upper rims 6A to 6F (a plurality of upper rims), the upper rim 6B is mounted on an upper spindle 32, and among different types of lower rims 5A to 5F, the lower rim 5E is mounted on a lower spindle 23. In FIG. 1, a tire T is shown by dotted lines.

Moreover, in FIG. 1, C indicates an area (hereinafter, referred to as a "rim carrying area C") which is located between the upper spindle 32 and the lower spindle 23 and to which the upper rims 6A to 6F and the lower rims 5A to 5F are carried, O indicates axes (hereinafter, referred to as an "axis O") of the upper spindle 32 and the lower spindle 23, $O_2$ indicates an axis (hereinafter, referred to as an "axis $O_2$") of the second post 62, and $O_3$ indicates an axis (hereinafter, referred to as a "center axis $O_3$") of the rim storage 17.

Moreover, in FIG. 1, an X direction indicates an arrangement direction of a measurement unit 13, a tire holding mechanism 15, a rim carrying mechanism 18, and the rim storage 17, and a Z direction indicates an up-down direction (vertical direction).

Figure 2:
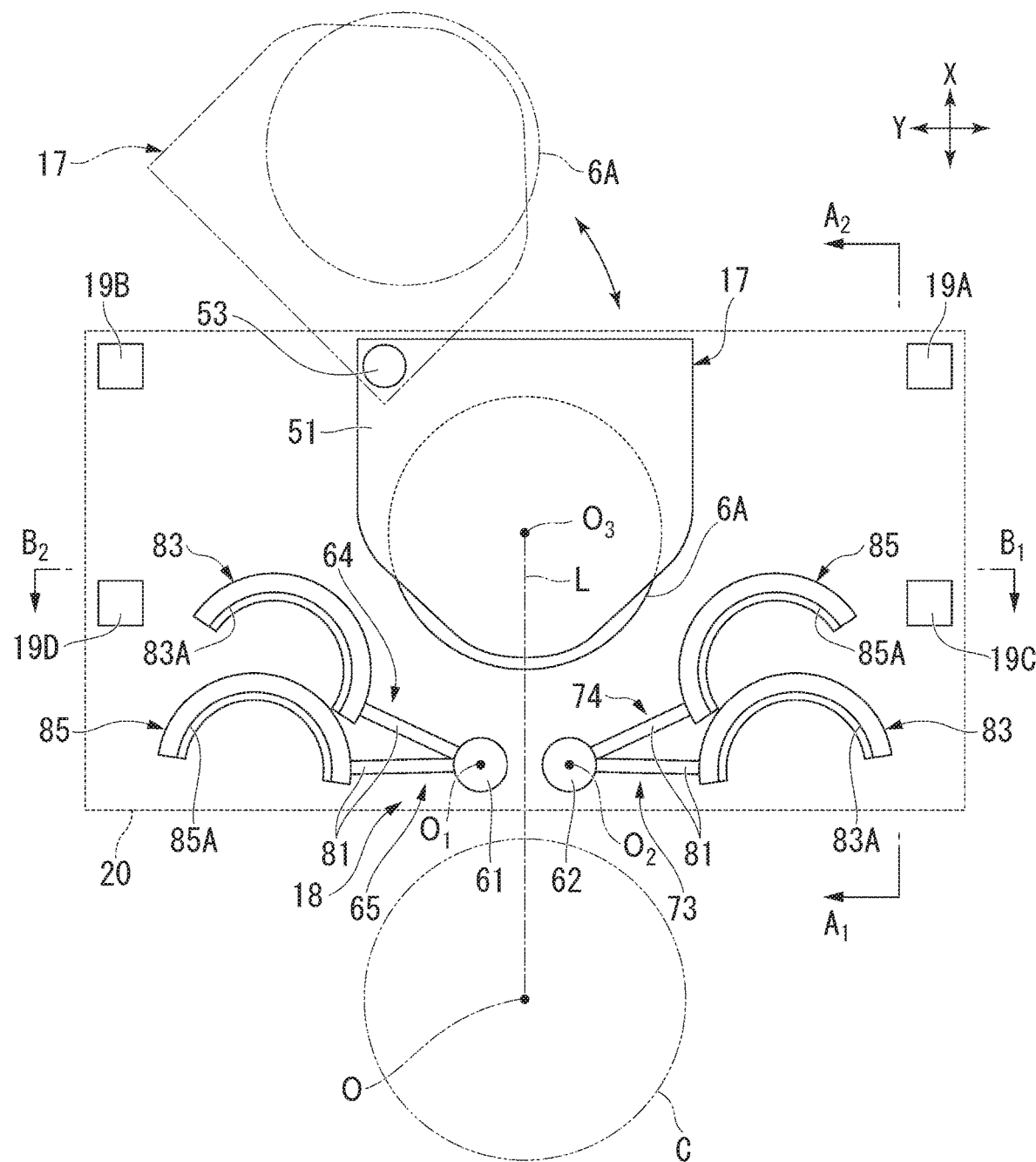
FIG. 2 is a plan view when a structure including a rim storage and a rim carrying mechanism shown in FIG. 1 is viewed from above.

In FIG. 2, for convenience of description, positions of a first carrying arm 64 and a second carrying arm 65 which are opposed to each other in the up-down direction (Z direction) are shown as being shifted.

For the same reason, in FIG. 2, positions of a third carrying arm 73 and a fourth carrying arm 74 which are opposed to each other in the up-down direction (Z direction) are shown as being shifted.

In addition, in FIG. 2, from the viewpoint of easily understanding the drawing, a top plate 20 is shown by dotted lines, and structures below the top plate 20 are shown by solid lines. Further, in FIG. 2, the rim storage 17 which is configured to turn outside the top plate 20 is shown by dotted lines.

In FIG. 2, a Y direction indicates an arrangement direction (facing direction) of the first and second posts 61 and 62 orthogonal to the Z direction and the X direction shown in FIG. 1, and L indicates a straight line (hereinafter, referred to as a "straight line L") which connects the center axis $O_3$ of the rim storage 17 and the center axis O of the upper spindle 32 and the lower spindle 23 to each other. In FIG. 2, the same reference signs are assigned to the same components as those of the structure shown in FIG. 1.

Figure 3:
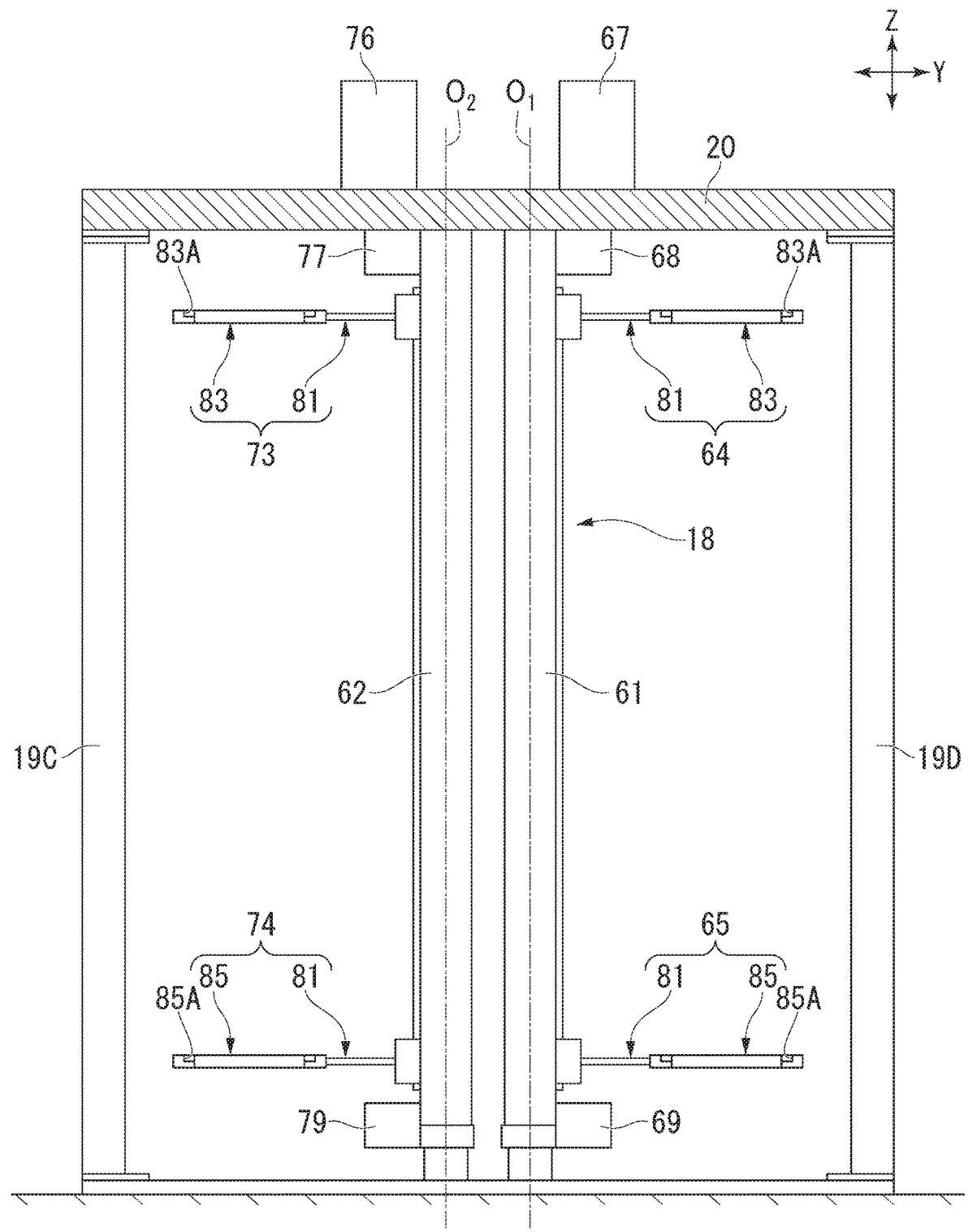
FIG. 3 is a cross-sectional view taken along line $B_1$-$B_2$ of the structure including the rim storage and the rim carrying mechanism shown in FIG. 2.

In FIG. 3, the same reference signs are assigned to the same components as those of the structure shown in FIGS. 1 and 2.

Figure 4:
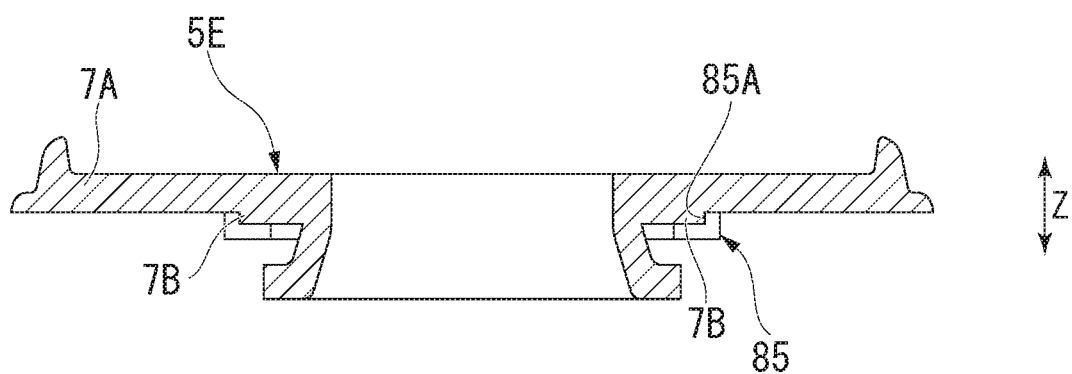
FIG. 4 is a side view of a lower rim support portion which supports a lower rim.
Figure 5:
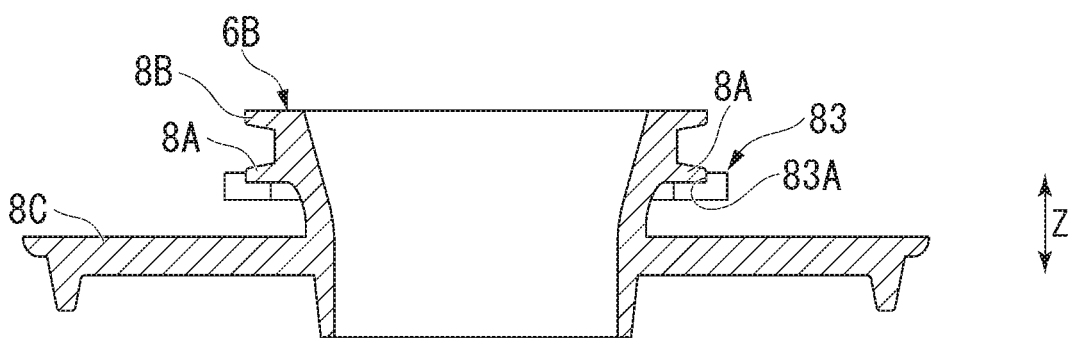
FIG. 5 is a side view of an upper rim support portion which supports an upper rim.

In FIGS. 4 and 5, the same reference signs are assigned to the same components as those of the structure shown in FIGS. 1 to 3. In FIG. 4, for convenience of explanation, a lower rim 5E is shown in cross section. In FIG. 5, for convenience of explanation, an upper rim 6B is shown in cross section.

The tire test device 10 includes a rim change device 11 and a measurement unit 13.

The rim change device 11 includes a tire holding mechanism 15, the rim storage 17, a rim carrying mechanism 18, posts 19A to 19D, and the top plate 20.

The tire holding mechanism 15 includes a base 21, a servo motor 22, a lower spindle 23, a post 25, an elevating unit 27, the upper spindle 32, and a tire carrier 34.

The base 21 is a base extending in a horizontal plane direction orthogonal to the Z direction.

The servo motor 22 is accommodated in the base 21 located below the lower spindle 23. The servo motor 22 is connected to the lower spindle 23 in a state where the servo motor 22 can rotate the lower spindle 23.

The lower spindle 23 is provided on the base 21 located above the servomotor 22. The lower spindle 23 has a protrusion 37 which inserted into a through portion of any one of the lower rims 5A to 5F to regulate a position of the lower rim.

In the case of FIG. 1, the lower spindle 23 is rotated by the servo motor 22 in a state where the tire T is interposed between the upper rim 6B and the lower rim 5E.

The post 25 is provided on the base 21. The post 25 extends upward from an upper surface 21a of the base 21.

The elevating unit 27 has a ball screw 39 and a rim elevator 42.

The ball screw 39 is provided on an upper portion of the post 25 and extends in the Z direction.

The rim elevator 42 is attached to the ball screw 39. Thereby, the rim elevator 42 is configured to be movable in the Z direction.

The rim elevator 42 supports the upper spindle 32. Thereby, the rim elevator 42 raises and lowers the upper spindle 32 in the Z direction.

Moreover, the elevating unit 27 may be configured by using the ball screw 39 and a slide rail together.

The upper spindle 32 is disposed above the lower spindle 23. The axes of the upper spindle 32 and the lower spindle 23 are coincident with each other. The axis of the upper spindle 32 and the axis of the lower spindle 23 are the axis O extending in the Z direction.

The upper spindle 32 has a chuck for chucking upper portions of the upper rims 6A to 6F at a lower portion. The upper spindle 32 closes the chuck to hold one upper rim (the upper rim 6B in FIG. 1). Moreover, the upper spindle 32 opens the chuck to release the held upper rim.

By lowering the upper spindle 32 from a state shown in FIG. 1, the tire T is held between the upper rim 6B and the lower rim 5E. Thereafter, the tire T interposed between the upper rim 6B and the lower rim 5E is rotated together with the upper spindle 32 and the lower spindle 23.

The tire carrier 34 extends in the Z direction and is attached to a ball screw different from the ball screw 39. Thus, the tire carrier 34 is configured to be movable in the Z direction.

The tire carrier 34 is a device for carrying the tire T to the rim carrying area C.

A drive unit which moves the tire carrier 34 in the Z direction may be configured by using a ball screw and a slide rail together.

The rim storage 17 is disposed so as to face the tire holding mechanism 15 in the X direction.

The rim storage 17 has a support plate 45, a plurality of lower rim support tables 47, a plurality of upper rim support tables 49, a top plate 51, and a turning shaft 53.

The support plate 45 is a rectangular plate of which a longitudinal direction is the Z direction and a lateral direction is the Y direction. The support plate 45 is supported on the floor by the turning shaft 53. The support plate 45 has a facing surface 45a facing the tire holding mechanism 15.

The plurality of lower rim support tables 47 are fixed to a lower portion of the facing surface 45a of the support plate 45 at intervals. The plurality of lower rim support tables 47 are tables for placing the lower rims 5A to 5F. Concave portions for suppressing displacements of the lower rims 5A to 5F are formed on upper surface sides of the plurality of lower rim support tables 47.

A second gap G2 of which a width in the Z direction is a width through which the second carrying arm 65 and the fourth carrying arm 74 can pass is formed between the lower rim 5D supported by the lower rim support table 47 and the lower rim support table 47 supporting the lower rim 5C.

Moreover, a formation position of the second gap G2 shown in FIG. 1 is an example, and is not limited to the structure shown in FIG. 1.

Here, the lower rim 5E among the lower rims 5A to 5F will be described.

The lower rim 5E includes a tire pressing portion 7A which is provided at an intermediate portion in the Z direction (height direction) and protrudes in the horizontal plane direction and a second flange portion 7B which protrudes downward from a lower surface side of the tire pressing portion 7A.

The tire pressing portion 7A is a portion which abuts on the tire T. The second flange portion 7B is a portion supported by the second and fourth carrying arms 65 and 74.

The lower rims 5A to 5D and 5F other than the lower rim 5E also have the second flange portion 7B. The lower rims 5A to 5F are rims having different heights.

The plurality of upper rim support tables 49 are fixed to an upper portion of the facing surface 45a of the support plate 45 at intervals. The plurality of upper rim support tables 49 are disposed above the plurality of lower rim support tables 47.

The plurality of upper rim support tables 49 are tables for placing the upper rims 6A to 6F. Concave portions for suppressing displacements of the upper rims 6A to 6F are formed on upper surface sides of the plurality of upper rim support tables 49.

A first gap G1 of which a width in the Z direction is a width through which the first carrying arm 64 and the third carrying arm 73 can pass is formed between the upper rim 6D supported by the upper rim support table 49 and the upper rim support table 49 supporting the upper rim 6C.

Moreover, a formation position of the first gap G1 shown in FIG. 1 is an example, and is not limited to the structure shown in FIG. 1.

Here, the upper rim 6B among the upper rims 6A to 6F will be described.

The upper rim 6B includes a first flange portion 8A which is provided at an intermediate portion in the Z direction (height direction) and protrudes in the horizontal plane direction, a flange portion 8B which is disposed above the first flange portion 8A, and a tire pressing portion 8C which is disposed below the first flange portion 8A.

The first flange portion 8A is a portion which is supported by the first and third carrying arms 64 and 73. The tire pressing portion 8C is a portion which abuts on the tire T.

The upper rims 6A and 6C to 6F other than the upper rim 6B also have a first flange portion 8A. The upper rims 6A to 6F are rims having different heights.

As described above, compared to a case where the plurality of upper rims 6A to 6F and the plurality of lower rims 5A to 5F are stored to be arranged in a plane, by storing the plurality of different types of upper rims 6A to 6F and the plurality of different types of lower rims 5A to 5F in the Z direction, it is possible to reduce an installation area of the rim storage 17 for storing the plurality of upper rims 6A to 6F and the plurality of lower rims 5A to 5F.

One end portion of the top plate 51 disposed in the X direction is fixed to an upper end of the support plate 45. The top plate 51 extends in a direction from the upper end of the support plate 45 toward the rim carrying mechanism 18. The top plate 51 faces the upper rim 6A which is disposed at the top.

The turning shaft 53 is provided so as to penetrate one end portion of the top plate 51 disposed in the Y direction and the top plates 20 and 51 disposed above the one end portion.

The turning shaft 53 turns a structure which includes the support plate 45, the plurality of lower rim support tables 47, the plurality of upper rim support tables 49, and the top plate 51 about the turning shaft 53.

As described above, since the rim storage 17 has the turning shaft 53, the plurality of upper rim support tables 49 and the plurality of lower rim support tables 47 together with the support plate 45 can be turned about the turning shaft 53.

Accordingly, the rim carrying mechanism 18 disposed between the tire holding mechanism 15 and the rim storage 17 does not hinder replacement works of the upper rims 6A to 6F and the lower rims 5A to 5F stored in the rim storage 17. Therefore, the replacement works of the upper rims 6A to 6F and the lower rims 5A to 5F stored in the rim storage 17 can be easily performed.

The rim carrying mechanism 18 is provided between the tire holding mechanism and the rim storage 17.

The rim carrying mechanism 18 includes the first post 61, the second post 62, the first carrying arm 64, the second carrying arm 65, a first turning unit 67, a first elevating unit 68, a second elevating unit 69, the third carrying arm 73, the fourth carrying arm 74, a second turning unit 76, a third elevating unit 77, and a fourth elevating unit 79.

The first and second posts 61 and 62 are disposed between the tire holding mechanism 15 and the rim storage 17. The first and second posts 61 and 62 are provided on the floor and extend in the Z direction. Upper ends of the first and second posts 61 and 62 are connected to a lower surface side of the top plate 20.

The first post 61 includes the first carrying arm 64 which supports and carries any one of the upper rims 6A and 6C to 6D stored in the rim storage 17, and the second carrying arm 65 which supports and carries any one of the lower rims 5A to 5D and 5F stored in the rim storage 17.

The second post 62 includes the third carrying arm 73 which collects the upper rim 6B mounted on the upper spindle 32 and stores the upper rim 6B in the rim storage 17 and the fourth carrying arm 74 which collects the lower rim 5E mounted on the lower spindle 23.

The second post 62 is disposed at a position adjacent to the first post 61. The first and second posts 61 and 62 are disposed to face each other in a direction (Y direction in FIG. 2) orthogonal to a straight line L which connects the center axis $O_3$ of the rim storage 17 and the center axes O of the upper spindle 32 and the lower spindle 23 to each other.

As described above, the first post 61 and the second post 62 are disposed to face each other in the direction orthogonal to the straight line L which connects the center axis $O_3$ of the rim storage 17 and the center axes O of the upper spindle 32 and the lower spindle 23 to each other. Accordingly, the first carrying arm 64 can be turned in a direction following the third carrying arm 73 from a side opposite to a side on which the third carrying arm 73 turns after the upper rim 6B is collected, and the second carrying arm 65 can be turned in a direction following the fourth carrying arm 74 from a side opposite to a side on which the fourth carrying arm 74 turns after the lower rim 5E is collected.

The first carrying arm 64 has an arm body 81 and an upper rim support portion 83.

One end of the arm body 81 is connected to the first post 61 in a state where the arm body 81 can turn about the first post 61 and can be raised or lowered in the Z direction.

The upper rim support portion 83 is a portion which supports any one of the upper rims 6A to 6F. The upper rim support portion 83 is fixed to the other end of the arm body 81. The upper rim support portion 83 is a member having a C shape, and a side thereof from the rim storage 17 toward the upper spindle 32 is open.

A first support groove 83A on which the first flange portions 8A of the upper rims 6A to 6F are placed is formed inside the upper rim support portion 83.

After the first carrying arm 64 configured as described above carries one upper rim selected from the rim storage 17 to a position (the rim carrying area C) below the upper spindle 32, the first carrying arm 64 is raised. Accordingly, the upper rim is mounted on the upper spindle 32.

Here, an example of an operation at the time of replacing the upper rim using the first carrying arm 64 in a case where the first carrying arm 64 is present at a position shown in FIG. 2 will be described.

First, the first carrying arm 64 is moved in the Z direction to a height at which the first carrying arm 64 can pass through the first gap G1. Next, by turning the first carrying arm 64, the first carrying arm 64 is moved to a position where the first carrying arm 64 passes through the first gap G1 and can move in the Z direction.

Next, the first carrying arm 64 is moved in the Z direction to the height of the upper rim to be mounted on the upper spindle 32. Next, the upper rim is placed on the upper rim support portion 83 by turning the first carrying arm 64 in a direction approaching the upper rim.

Next, the first carrying arm 64 is turned in a direction toward the position of the first carrying arm 64 shown in FIG. 2. Thereafter, the first carrying arm 64 is moved in the Z direction as needed, and the first carrying arm 64 stands by near the rim carrying area C.

Then, the third carrying arm 73 is moved downward to a height at which the third carrying arm 73 can turn with the upper rim 6B mounted thereon, and the first carrying arm 64 is turned into the rim carrying area C at the same timing when the third carrying arm 73 turns in the direction toward the rim storage 17.

Thereafter, the first carrying arm 64 is raised toward the upper spindle 32, and the chuck of the upper spindle 32 chucks the upper portion of the upper rim, and thus, the replacement of the upper rim is completed.

The second carrying arm 65 is provided on the first post 61 located below the first carrying arm 64. The second carrying arm 65 is disposed to face the first carrying arm 64 in the Z direction (refer to FIG. 3). That is, when the first and second carrying arms 64 and 65 are viewed from above the first carrying arm 64, only the first carrying arm 64 can be viewed.

The second carrying arm 65 is configured similarly to the first carrying arm 64 except that the second carrying arm 65 has a lower rim support portion 85 instead of the upper rim support portion 83 constituting the first carrying arm 64.

One end of the arm body 81 constituting the second carrying arm 65 is connected to the first post 61 in a state where the arm body 81 can turn about the first post 61 and can be raised or lowered in the Z direction.

The lower rim support portion 85 is a portion which supports any one of the plurality of lower rims 5A to 5F. The lower rim support portion 85 is fixed to the other end of the arm body 81. The lower rim support portion 85 is a member having a C shape, and a side thereof from the rim storage 17 toward the lower spindle 23 is open.

A second support groove 85A on which the second flange portions 7B of the lower rims 5A to 5F are placed is formed inside the lower rim support portion 85.

After the second carrying arm 65 configured as described above carries one lower rim selected from the rim storage 17 to a position (the rim carrying area C) above the lower spindle 23, the second carrying arm 65 is lowered. Accordingly, the lower rim is mounted on the protrusion 37 of the lower spindle 23.

Here, an example of an operation at the time of replacing the lower rim using the second carrying arm 65 in a case where the second carrying arm 65 is present at a position shown in FIG. 2 will be described.

First, the second carrying arm 65 is moved in the Z direction to a height at which the second carrying arm 65 can pass through the second gap G2.

Next, by turning the second carrying arm 65, the second carrying arm 65 which has passed through the second gap G2 is moved to a position at which the second carrying arm 65 can move in the Z direction.

Next, the second carrying arm 65 is moved in the Z direction to the height of the lower rim to be mounted on the lower spindle 23. Next, the lower rim is placed on the lower rim support portion 85 by turning the second carrying arm 65 in a direction approaching the lower rim.

Next, the second carrying arm 65 is turned in a direction toward the position of the second carrying arm 65 shown in FIG. 2. Thereafter, the second carrying arm 65 is moved in the Z direction as needed, and the second carrying arm 65 stands by near the rim carrying area C.

Then, the fourth carrying arm 74 is moved upward to a height at which the fourth carrying arm 74 can turn with the lower rim 5E mounted thereon, and the second carrying arm 65 is turned into the rim carrying area C at the same timing when the fourth carrying arm 74 turns in the direction toward the rim storage 17.

Thereafter, the second carrying arm 65 is lowered in a direction toward the lower spindle 23, and the lower rim is inserted into the lower spindle 23. Thereafter, the second carrying arm 65 is turned in a direction toward the position of the second carrying arm 65 shown in FIG. 2. Accordingly, the replacement of the lower rim is completed.

The first turning unit 67 is provided on the top plate 20. The first turning unit 67 turns the first and second carrying arms 64 and 65 at the same timing and in the same direction. Accordingly, the second carrying arm 65 turns in a state where the second carrying arm 65 overlaps the first carrying arm 64 when viewed in the Z direction.

The first turning unit 67 having the configuration is provided, and thus, it is possible to simultaneously collect the upper rim and carry the upper rim (another upper rim). Therefore, it is possible to further reduce a replacement time of the upper rim.

The first elevating unit 68 is provided in an upper end portion of the first post 61. The first elevating unit 68 raises or lowers the first carrying arm 64 along the first post 61 in the Z direction.

The second elevating unit 69 is provided in a lower end portion of the first post 61. The second elevating unit 69 raises and lowers the second carrying arm 65 along the second post 62 in the Z direction.

The first and second elevating units 68 and 69 having the configurations are provided, and thus, the raising and lowering of the first carrying arm 64 and the raising and lowering of the second carrying arm 65 can be controlled separately. That is, the first carrying arm 64 and the second carrying arm 65 can be moved in the Z direction in a state of being independent from each other.

The third carrying arm 73 is configured similarly to the first carrying arm 64 except that an opening of the C-shaped upper rim support portion 83 is formed on a side from the rim storage 17 toward the upper spindle 32.

One end of the arm body 81 constituting the third carrying arm 73 is connected to the second post 62 in a state where the arm body 81 can turn about the second post 62 and can be raised or lowered in the Z direction.

The third carrying arm 73 is an arm for carrying the upper rim 6B collected from the upper spindle 32 and storing the upper rim 6B in the rim storage 17.

Here, an example of an operation at the time of collecting the upper rim using the third carrying arm 73 in a case where the third carrying arm 73 is present at a position shown in FIG. 2 will be described.

First, the third carrying arm 73 is moved in the Z direction to a height at which the third carrying arm 73 can collect the upper rim 6B.

Next, by turning the third carrying arm 73 in a direction toward the upper rim 6B, the upper rim 6B is placed in the first support groove 83A of the upper rim support portion 83.

Next, in a stage in which the chuck of the upper spindle 32 is opened, the third carrying arm 73 is turned in a direction toward the rim storage 17, and third carrying arm 73 is stopped at a position where the upper rim 6B can be disposed on the upper rim support table 49 for storing the collected upper rim 6B.

Next, the third carrying arm 73 is slightly moved downward, and thus, the collected upper rim 6B is placed on the upper rim support table 49. Accordingly, the collection of the upper rim 6B is completed.

Next, the third carrying arm 73 is slightly turned toward the first carrying arm 64 side shown in FIG. 2 and is stopped at a position where the third carrying arm 73 can be raised or lowered in the Z direction.

Next, the third carrying arm 73 is moved in the Z direction to a height at which the third carrying arm 73 can pass through the first gap G1. Thereafter, the third carrying arm 73 is turned to pass through the first gap G1, and is moved to the position of the third carrying arm 73 shown in FIG. 2.

The fourth carrying arm 74 is configured similarly to the second carrying arm 65 except that an opening of the C-shaped lower rim support portion 85 is formed on a side from the rim storage 17 toward the lower spindle 23.

One end of the arm body 81 constituting the fourth carrying arm 74 is connected to the second post 62 in a state where the arm body 81 can turn about the second post 62 and can be raised or lowered in the Z direction.

The fourth carrying arm 74 is disposed to face the third carrying arm 73 in the Z direction (refer to FIG. 3). That is, when the third and fourth carrying arms 73 and 74 are viewed from above the third carrying arm 73, only the third carrying arm 73 can be viewed.

The fourth carrying arm 74 is an arm for carrying the lower rim 5E collected from the lower spindle 23 and storing the lower rim 5E in the rim storage 17.

Here, an example of an operation at the time of collecting the lower rim using the fourth carrying arm 74 in a case where the fourth carrying arm 74 is present at a position shown in FIG. 2 will be described.

First, the fourth carrying arm 74 is moved in the Z direction to a height at which the lower rim 5E can be collected.

Next, the fourth carrying arm 74 is turned in a direction toward the lower rim 5E, and the fourth carrying arm 74 is moved slightly upward. Accordingly, the lower rim 5E is placed in the second support groove 85A of the lower rim support portion 85.

Next, the fourth carrying arm 74 is moved upward and is stopped at a position of the fourth carrying arm 74 shown by dotted lines in FIG. 1.

Next, the fourth carrying arm 74 is turned in the direction toward the rim storage 17, and the fourth carrying arm 74 is stopped at a position where the lower rim 5E can be displaced on the lower rim support table 47 for storing the collected lower rim 5E.

Next, the fourth carrying arm 74 is slightly moved downward, and the collected lower rim 5E is placed on the lower rim support table 47. Accordingly, the collection of the lower rim 5E is completed.

Next, the fourth carrying arm 74 is slightly turned toward the second carrying arm 65 side shown in FIG. 2 and is stopped at a position where the fourth carrying arm 74 can be raised or lowered in the Z direction.

Next, the fourth carrying arm 74 is moved in the Z direction to a height at which the fourth carrying arm 74 can pass through the second gap G2. Thereafter, the fourth carrying arm 74 is turned to pass through the second gap G2, and thus, is moved to the position of the fourth carrying arm 74 shown in FIG. 2.

The second turning unit 76 is provided on the top plate 20. The second turning unit 76 turns the third and fourth carrying arms 73 and 74 at the same timing and in the same direction. Accordingly, the fourth carrying arm 74 turns in a state where the fourth carrying arm 74 overlaps the third carrying arm 73 when viewed in the Z direction.

The second turning unit 76 having the configuration is provided, and thus, it is possible to simultaneously collect the lower rim and carry the lower rim (another lower rim). Therefore, it is possible to further reduce a replacement time of the lower rim.

The third elevating unit 77 is provided in an upper end portion of the second post 62. The third elevating unit 77 raises or lowers the third carrying arm 73 along the second post 62 in the Z direction.

The fourth elevating unit 79 is provided in a lower end portion of the second post 62. The fourth elevating unit 79 raises and lowers the fourth carrying arm 74 along the second post 62 in the Z direction.

The third and fourth elevating units 77 and 79 having the configurations are provided, and thus, the raising and lowering of the third carrying arm 73 and the raising and lowering of the fourth carrying arm 74 can be controlled separately. That is, the third carrying arm 73 and the fourth carrying arm 74 can be moved in the Z direction in a state of being independent from each other.

As described above, each of the first and third carrying arms 64 and 73 has the C-shaped upper rim support portion 83. Accordingly, when the first and third carrying arms 64 and 73 are turned in the same direction, after an interference between the first carrying arm 64 and the third carrying arm 73 is suppressed, the upper rim 6B can be collected from the upper spindle 32 and the upper rim stored in the rim storage 17 can be carried to the upper spindle 32.

Further, each of the second and fourth carrying arms 65 and 74 has the C-shaped lower rim support portion 85. Accordingly, when the second and fourth carrying arms 65 and 74 are turned in the same direction, after an interference between the second carrying arm 65 and the fourth carrying arm 74 is suppressed, the lower rim 5E can be collected from the lower spindle 23 and the upper rim stored in the rim storage 17 can be carried to the lower spindle 23.

Further, as described above, the first gap G1 through which the first carrying arm 64 can pass is formed between at least two upper rims (in FIG. 1, as an example, between the upper rim 6C and the upper rim 6D) of the plurality of upper rims disposed in the Z direction. Accordingly, after the first carrying arm 64 passes through the first gap G1, the upper rim stored in the rim storage 17 is supported by the C-shaped upper rim support portion 83, and the upper rim can be turned and carried in the direction from the rim storage 17 toward the upper spindle 32.

In addition, the third carrying arm 73 is configured to pass through the first gap G1, and thus, after the third carrying arm 73 having the C-shaped upper rim support portion 83 stores the upper rim 6B in the rim storage 17, the third carrying arm 73 which does not support the upper rim 6B passes through the first gap G1. Accordingly, the third carrying arm 73 can move to a portion between the rim storage 17 and the lower spindle 23.

Moreover, as described above, the second gap G2 through which the second carrying arm 65 can pass is formed between at least two lower rims (in FIG. 1, as an example, between the lower rim 5D and the lower rim 5F) of the plurality of lower rims disposed in the Z direction. Accordingly, after the second carrying arm 65 passes through the second gap G2, the lower rim stored in the rim storage 17 is supported by the C-shaped lower rim support portion 85, and the lower rim can be turned and carried in the direction from the rim storage 17 toward the lower spindle 23.

In addition, the fourth carrying arm 74 is configured to pass through the second gap G2, and thus, after the fourth carrying arm 74 having the C-shaped lower rim support portion 85 stores the lower rim 5E in the rim storage 17, the fourth carrying arm 74 which does not support the lower rim 5E passes through the second gap G2. Accordingly, the fourth carrying arm 74 can move to a portion between the rim storage 17 and the lower spindle 23.

Next, the posts 19A to 19D will be described.

The posts 19A to 19D are provided on the floor and extend in the Z direction. The posts 19A and 19B are opposed to each other in the Y direction with the rim storage 17 interposed there between.

The posts 19C and 19D are disposed on the rim carrying mechanism 18 side of the posts 19A and 19B. The post 19C faces the post 19A in the X direction and faces the post 19D in the Y direction. The post 19D faces the support 19B in the X direction.

The top plate 20 is disposed on upper ends of the posts 19A to 19D. The posts 19A to 19D support the top plate 20.

The top plate 20 is a plate-shaped member, and is disposed on the upper ends of the posts 19A to 19D, the first post 61, and the second post 62. The top plate 20 is supported by the posts 19A to 19D, the first post 61, and the second post 62.

Next, the measurement unit 13 will be described.

The measurement unit 13 is a measurement device which measures characteristics of the tire T which is held by the upper rim 6B and the lower rim 5E. The measurement unit 13 includes a rail 80, a moving unit 86, and a load wheel 87.

The rail 80 is provided on the upper surface 21a of the base 21. The rail80 extends in a direction toward the lower spindle 23.

The moving unit 86 is disposed on the rail 80 in a state of being movable on the rail 80.

The load wheel 87 is rotatable provided on the moving unit 86. The load wheel 87 is configured to be movable together with the moving unit 86 in a direction in which the rail 80 extends. Only the load wheel 87 performs a measurement, the load wheel 87 approaches the lower spindle 23 to apply a predetermined load to the tire T.

For example, the characteristics of the tire T measured by the measurement unit 13 having the configuration may include a radial force variation (RFV) indicating a change in a radial force, a lateral force variation (LFV) indicating a change in an axial force, a tangential force variation (TFV) indicating a variation in a force in a traveling direction, or the like.

According to the rim change device 11 of the present embodiment, the rim change device 11 includes the first carrying arm 64 which carries the upper rim selected from the rim storage 17 to the upper spindle 32 and the third carrying arm 73 which carries the upper rim 6B collected from the upper spindle 32 and stores the upper rim 6B in the rim storage 17, and the first carrying arm 64 turns in the direction following the third carrying arm 73 from the side opposite to the side on which the third carrying arm 73 turns after the upper rim 6B is collected to carry another upper rim to the upper spindle 32. Accordingly, it is possible to carry another upper rim to the upper spindle 32 at the same timing as a start of the turning of the upper rim 6B collected from the upper spindle 32. Thereby, it is possible to further reduce the replacement time of the upper rim.

Moreover, the rim change device 11 includes the second carrying arm 65 which carries the lower rim selected from the rim storage 17 to the lower spindle 23 and the fourth carrying arm 74 which carries the lower rim 5E collected from the lower spindle 23 and stores the lower rim 5E in the rim storage 17, and the second carrying arm 65 turns in the direction following the fourth carrying arm 74 from the side opposite to the side on which the fourth carrying arm 74 turns after the lower rim is collected to carry another lower rim to the lower spindle 23. Accordingly, it is possible to carry another lower rim to the lower spindle 23 at the same timing as a start of the turning of the lower rim 5E collected from the lower spindle 23. Thereby, it is possible to further reduce the replacement time of the lower rim.

Further, according to the tire test device 10 of the present embodiment, the tire test device 10 includes the above-described rim change device 11 and the measurement unit 13. Accordingly, it is possible to reduce times for collecting the upper rim from the upper spindle 32 and carrying the upper rim to the upper spindle 32 and times for collecting the lower rim from the lower spindle 23 and carrying the lower rim to the lower spindle 23. Accordingly, it is possible to reduce a time required for measuring the characteristics of the tire T including the replacement times of the upper rim and the lower rim.

Figure 7:
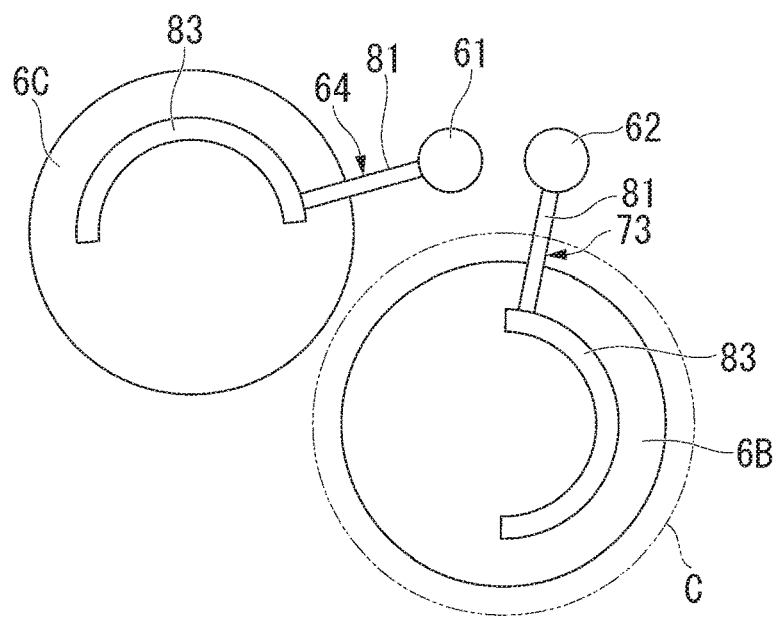
FIG. 7 is a view showing positional relationships between first to fourth carrying arms before the rim is replaced.
Figure 8:
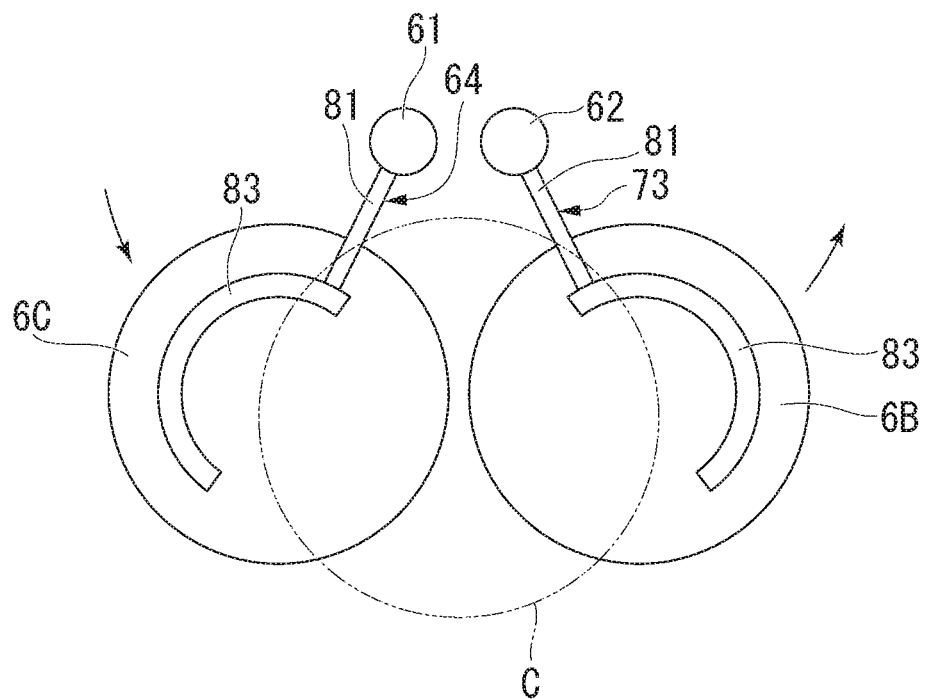
FIG. 8 is a view showing turning and the positional relationships of the first to fourth carrying arms in an early stage of the rim replacement.
Figure 9:
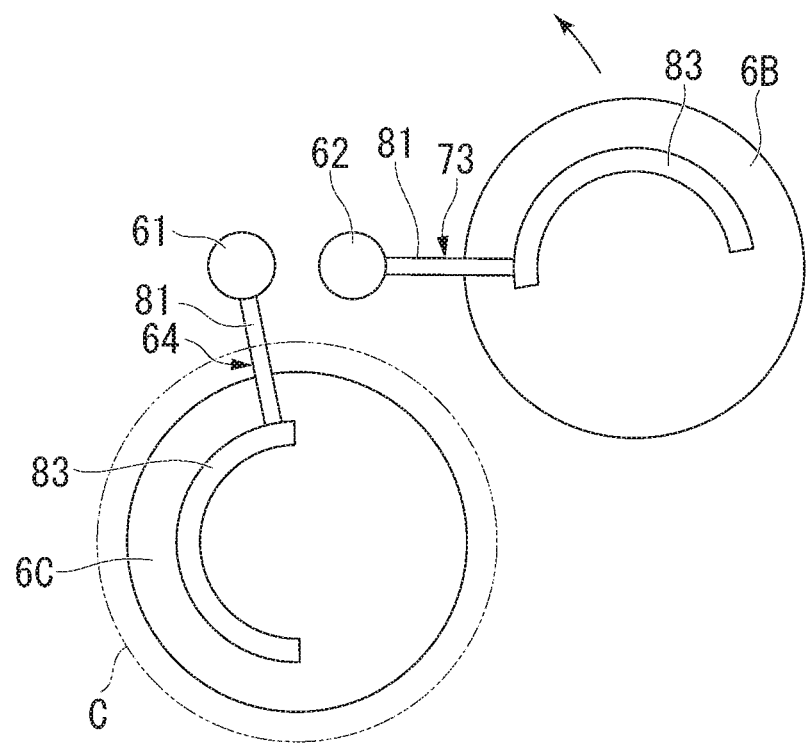
FIG. 9 is a view showing the turning and the positional relationships of first to fourth carrying arms when the upper rim and the lower rim are carried into a rim carrying area.

Next, a rim replacement method according to the present embodiment will be described with reference to FIGS. 1 to 3 and FIGS. 6 to 9. In FIGS. 7 to 9, the same reference signs are assigned to the same components as those of the structure shown in FIG. 2. Moreover, in FIGS. 7 to 9, the second carrying arm 65 is disposed below the first carrying arm 64, and the fourth carrying arm 74 is disposed below the third carrying arm 73. However, since it is difficult to show the second and fourth carrying arms 65 and 74, illustrations thereof are omitted. Moreover, in FIGS. 7 to 9, the upper rims 6B and 6C are shown in a simplified manner.

Figure 6:
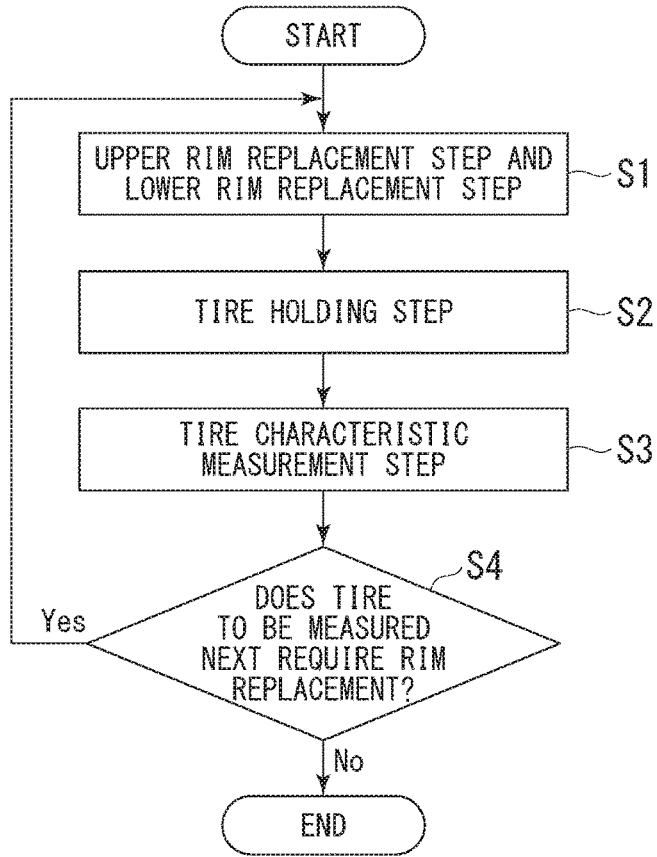
FIG. 6 is a flowchart showing an upper rim replacement step, a lower rim replacement step, and a measuring step of characteristics of a tire T.

When the processing shown in FIG. 6 starts, in S, an upper rim replacement step and a lower rim replacement step are performed simultaneously.

First, in a stage before replacing the upper rim and the lower rim (a stage before the third and fourth carrying arms 73 and 74 are retreated), the first and second carrying arms 64 and 65 are moved in the Z direction at the same timing and repeatedly perform the operation of turning in the same direction at the same timing with the same turning amount. Accordingly, the first carrying arm 64 supports the upper rim 6C (refer FIG. 7) in the rim storage 17 and the second carrying arm 65 supports a lower rim (another lower rim different from the lower rim 5E) in the rim storage 17.

Next, as shown in FIG. 7, the first and second carrying arms 64 and 65 are turned in the same direction by the same turning amount, and thus, the first and second carrying arms 64 and 65 are moved to near the rim carrying area C.

As described above, in a stage before the third carrying arm 73 is retreated from the rim carrying area C, the first carrying arm 64 supporting the upper rim 6C remains stationary near the upper spindle 32. Accordingly, when the third carrying arm 73 starts retreating, the upper rim 6C can be quickly carried below the upper spindle 32 (refer to FIGS. 7 and 8). Thereby, it is possible to further reduce the replacement time of the upper rim.

In addition, in a stage before the fourth carrying arm 74 is retreated from the rim carrying area C, the second carrying arm 65 supporting the lower rim remains stationary near the lower spindle 23. Accordingly, when the fourth carrying arm 74 starts retreating, another lower rim can be quickly carried above the lower spindle 23. Thereby, it is possible to further reduce the replacement time of the lower rim.

Next, in a stage where the test of the tire T is completed, the third and fourth carrying arms 73 and 74 are moved in the Z direction at the same timing and repeatedly perform the operation of turning in the same direction at the same timing with the same turning amount. Accordingly, the third carrying arm 73 collects the upper rim 6B and the fourth carrying arm 74 collects the lower rim 5E.

Thereafter, the third and fourth carrying arms 73 and 74 are raised or lowered to a position where the third and fourth carrying arms 73 and 74 can turn. At this time, a height of the third carrying arm 73 is equal to a height of the first carrying arm 64, and a height of the fourth carrying arm 74 is equal to a height of the second carrying arm 65.

Next, as shown in FIG. 8, the upper rim replacement step and the lower rim replacement step are simultaneously performed. That is, in the upper rim placement step, when the third carrying arm 73 is turned in the direction toward the rim storage 17, the first carrying arm 64 supporting the upper rim 6C is turned and moved below the upper spindle 32 so as to follow the turning third carrying arm 73 so that the upper rim 6C is moved below the upper spindle 32. In addition, in the lower rim placement step, when the fourth carrying arm 73 is turned in the direction toward the rim storage 17, the second carrying arm 65 supporting another lower rim is turned and moved so as to follow the turning fourth carrying arm 74 so that another lower rim is moved above the lower spindle 23.

In the upper rim replacement step, the first carrying arm 64 is turned in conjunction with the retreating of the third carrying arm 73 supporting the upper rim 6B from below the upper spindle 32. Accordingly, the upper rim 6C is carried to the rim carrying area C located below the upper spindle 32 (refer to FIG. 9).

In addition, in the lower rim replacement step, another lower rim is carried to the rim carrying area C located above the lower spindle 23 in conjunction with the retreating of the fourth carrying arm supporting the lower rim 5E from above the lower spindle 23.

Thereafter, the mounting of the upper rim 6C on the upper spindle 32 and the mounting of another lower rim on the lower spindle 23 are performed simultaneously. Moreover, the collected upper rim 6B and lower rim 5E are stored in the rim storage 17 at the same timing as the start of mounting of the upper rim 6C and another lower rim.

In the upper rim replacement step and the lower rim replacement step, the first and second carrying arms 64 and 65 are turned and are raised or lowered so that the first carrying arm 64 and the second carrying arm 65 overlap each other in the Z direction, and the third and fourth carrying arms 73 and 74 are turned and are raised or lowered so that the third carrying arm 73 and the fourth carrying arm 74 overlap each other in the Z direction.

As described above, the first and second carrying arms 64 and 65 are turned and are raised or lowered so as to overlap each other in the Z direction, and the third and fourth carrying arms 73 and 74 are turned and are raised or lowered so as to overlap each other in the Z direction. Accordingly, the upper rim and the lower rim can be replaced at the same time. Thereby, it is possible to further reduce the replacement times of the upper rim and the lower rim.

Next, in S2, the upper spindle 32 moves downward to hold the tire between the upper rim 6C and another lower rim.

Next, in S3, the characteristics of the tire is measured using the measurement unit 13. When the measurement of the tire characteristics is completed, the processing proceeds to S4.

Next, in S4, whether or not a tire to be measured next needs rim replacement is determined. If Yes is determined in S4, the processing returns to S1. If No is determined, the processing shown in FIG. 6 ends.

According to the rim replacement method of the present embodiment, in the upper rim replacement step, the first carrying arm 64 carries the upper rim 6C below the upper spindle 32 in conjunction with the retreating of the third carrying arm 73 supporting the upper rim 6B from below the upper spindle 32. Accordingly, the carrying of the upper rim 6C below the upper spindle 32 can start at the same time as the retreat start of the upper rim 6B. Thereby, it is possible to further reduce the replacement time of the upper rim.

In addition, in the lower rim replacement step, the second carrying arm 65 carries another lower rim above the lower spindle 23 in conjunction with the retreating of the fourth carrying arm 74 supporting the lower rim 5E from above the lower spindle 23. Accordingly, the carrying of another lower rim above the lower spindle 23 can start at the same time as the retreat start of the lower rim 5E. Thereby, it is possible to further reduce the replacement time of the lower rim.

Hereinbefore, the preferred embodiments of the present invention are described in detail. However, the present invention is not limited to the specific embodiments, and various modifications and changes are possible within a scope of the present invention described in the claims.

Moreover, in the present embodiment, the rim storage 17 in which the plurality of upper rims and lower rims are disposed in the Z direction is described as an example of the rim storage. However, for example, the arm bodies 81 of the first to fourth carrying arms 64, 65, 73, and 74 are configured to be extendable or contractable, and instead of the rim storage 17, an upper rim storage for storing the plurality of upper rims 6A to 6F in the Z direction and a lower rim storage for storing the plurality of lower rims 5A to 5F may be provided.

Further, in the present embodiment, the rim storage 17 which can be turned is described as an example of the rim storage. However, for example, a rim storage which can pull out the support plate 45, the plurality of lower rim support tables 47, and the plurality of upper rim support tables 49 may be used outside (X direction) the top plate 20. In a case where the rim storage having the configuration is used, the same effects as those of the above-described rim storage 17 can be obtained.

Further, in the present embodiment, a uniformity machine is described as an example of the measurement unit 13. However, the present invention is also applicable to an inspection device requiring the rim replacement other than the uniformity machine.

Here, a rim storage 90 according to a modification example of the present embodiment will be described with reference to FIGS. 10 and 11.

Figure 10:
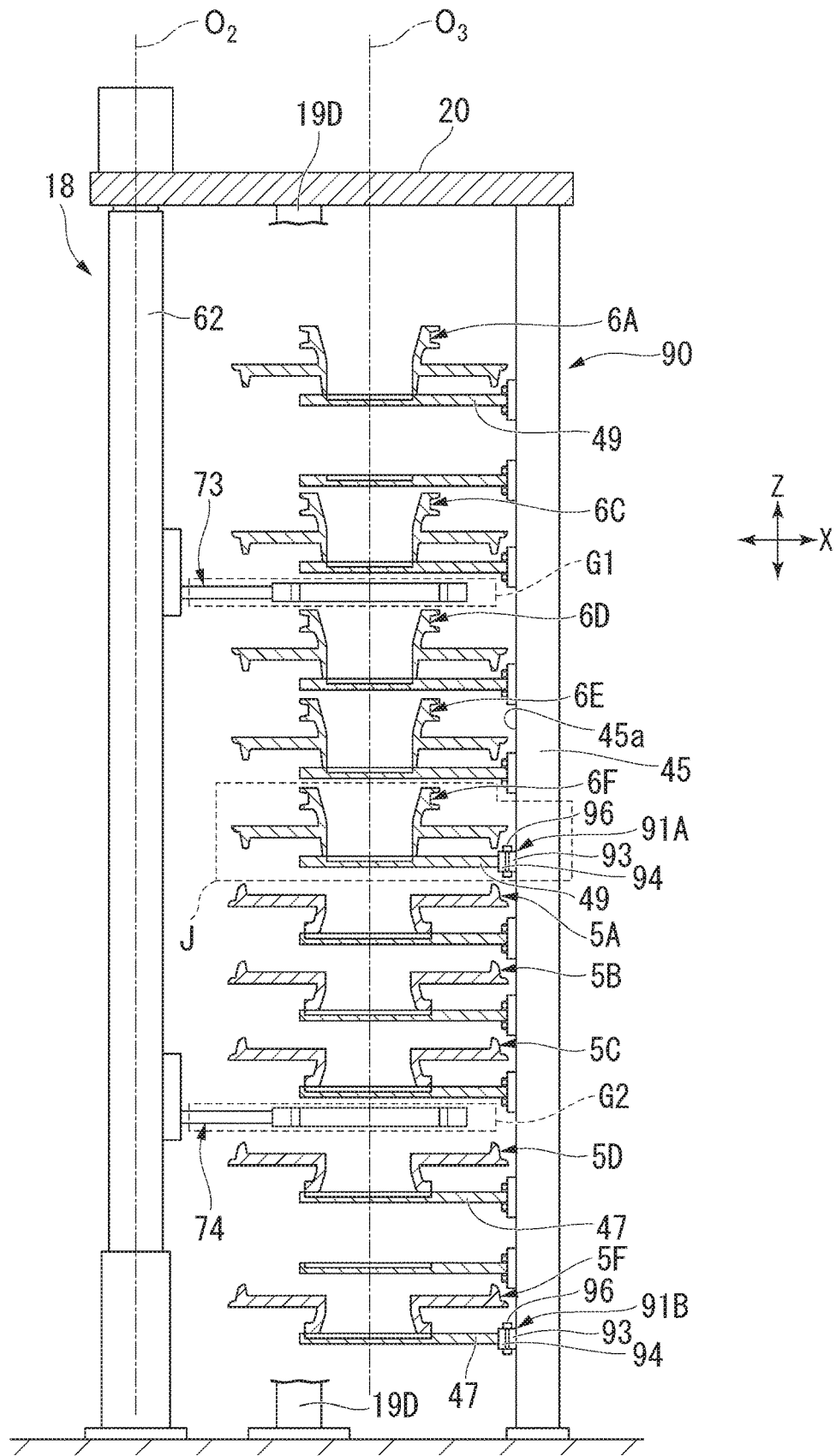
FIG. 10 is a side view showing a modification example of the rim storage.

FIG. 10 also shows the rim carrying mechanism 18 in addition to the rim storage 90. In FIG. 10, the same reference signs are assigned to the same components as those of the structure shown in FIG. 1. In FIG. 11, the support plate 45 is shown in cross section.

The rim storage 90 is configured similarly to the rim storage 17 except that hinge mechanisms 91A and 91B are provided instead of the top plate 51 and the turning shaft 53 constituting the rim storage 17, and the upper end of the support plate 45 is connected to the lower surface side of the top plate 20.

The hinge mechanism 91A is provided between the upper rim support table 49 which supports the upper rim 6F and the support plate 45. The hinge mechanism 91A includes a fixing unit 93, a moving unit 94, a tubular portion 96, and a shaft portion 98.

The fixing unit 93 is a member extending in the Y direction, and is fixed to the facing surface 45a of the support portion plate 45. The fixing unit 93 has one end located in the X direction which is fixed to an upper portion of the tubular portion 96.

The moving unit 94 is a member extending in the Y direction, and one end of the moving unit 94 located in the X direction is fixed to a lower portion of the tubular portion 96. The moving unit 94 faces the fixing unit 93 in the Y direction.

The tubular portion 96 is disposed on one side in the Y direction. A through hole extending in the Z direction is formed inside the tubular portion 96. The tubular portion 96 has a configuration in which an upper portion and a lower portion are separated from each other.

The shaft portion 98 is inserted into a through hole formed in the tubular portion 96. Accordingly, a lower portion of the tubular portion 96 is configured to be able to turn about the shaft portion 98 in the direction of an arrow shown in FIG. 11. Thus, the moving unit 94 and the upper rim support table 49 can be turned together with the lower portion of the tubular portion 96. Moreover, an upper portion of the tubular portion 96 does not turn.

The hinge mechanism 91B is provided between the lower rim support table 47 which supports the lower rim 5F and the support plate 45. The hinge mechanism 91B has the same configuration as the hinge mechanism 91A described above. That is, the hinge mechanism 91B includes the fixing unit 93, the moving unit 94, the tubular portion 96, and the shaft portion 98.

As a result, the moving unit 94 and the lower rim support table 47 are configured to be able to turn together with the lower portion of the tubular portion 96. Moreover, an upper portion of the tubular portion 96 does not turn.

According to the rim storage 90 configured as described above, the rim replacement can be easily performed in the upper rim support table 49 provided with the hinge mechanism 91A and the lower rim support table 47 provided with the hinge mechanism 91B.

Figure 11:
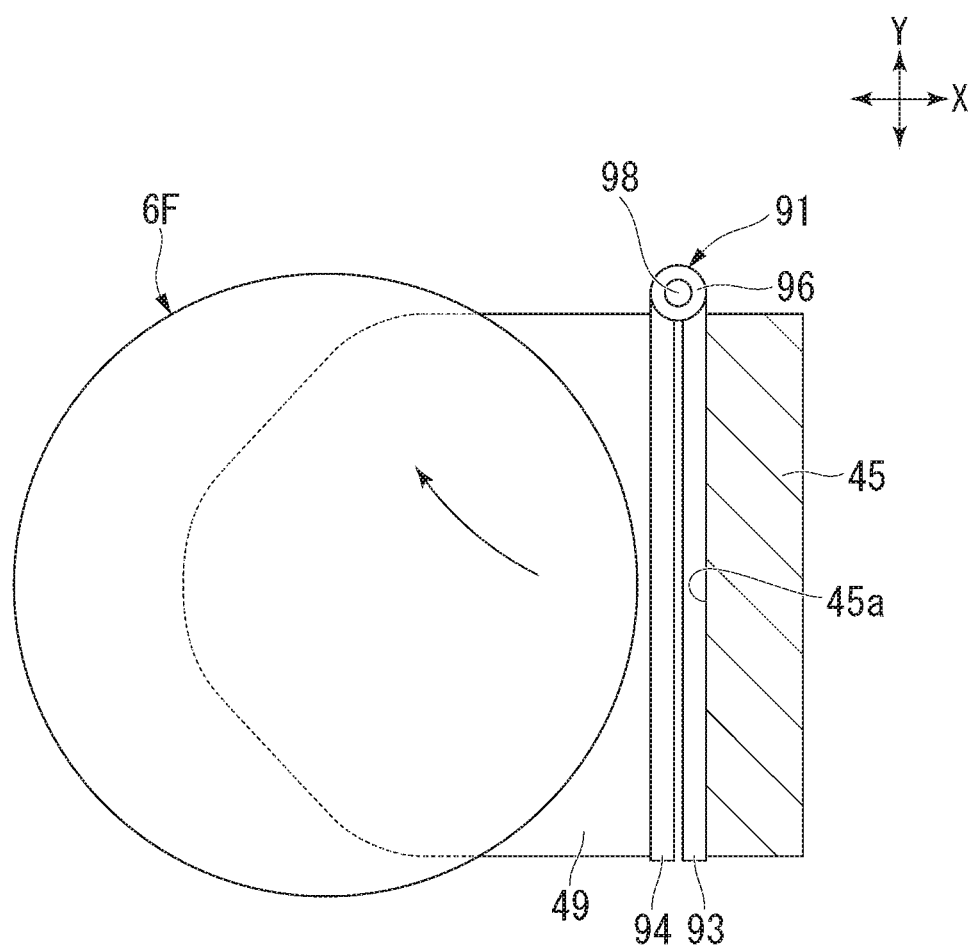
FIG. 11 is a plan view when a portion surrounded by a region J in the rim storage shown in FIG. 10 is viewed from above.

In FIGS. 10 and 11, the case where the hinge mechanisms 91A and 91B are respectively provided only for one upper rim support table 49 and one lower rim support table 47 is described as an example. However, the hinge mechanisms 91A and 91B may be respectively provided for two or more upper rim support tables 49 and two or more lower rim support tables 47, or the hinge mechanisms 91A and 91B may be respectively provided for all upper rim support tables 49 and lower rim support tables 47.

INDUSTRIAL APPLICABILITY

The present invention is applicable to a rim change device, a tire test device, and a rim replacement method.

REFERENCE SIGNS LIST 5A to 5F: lower rim
6A to 6F: upper rim
7A and 8C: tire pressing portion
7B: second flange portion
8A: first flange portion
8B: flange portion
10: tire test device
11: rim change device
13: measurement unit
15: tire holding mechanism
17 and 90: rim storage
18: rim carrying mechanism
19A to 19D and 25: post
20 and 51: top plate
21: base
21a: upper surface
22: servo motor
23: lower spindle
27: elevating unit
32: upper spindle
34: tire carrier
37: protrusion
39: ball screw
42: rim elevator
45: support plate
45a: facing surface
47: lower rim support table
49: upper rim support table
53: turning shaft
61: first post
62: second post
64: first carrying arm
65: second carrying arm
67: first turning unit
68: first elevating unit
69: second elevating unit
73: third carrying arm
74: fourth carrying arm
76: second turning unit
77: third elevating unit
79: fourth elevating unit
80: rail
81: arm body
83: upper rim support portion
83A: first support groove
85: lower rim support portion
85A: second support groove
86: moving unit
87: load wheel
91A and 91B: hinge mechanism
93: fixing unit
94: moving unit
96: tubular portion
98: shaft portion
C: rim carrying area
L: straight line
G1: first gap
G2: second gap
J: area
O, $O_1$, $O_2$, and $O_3$: axis
T: tire

What is claimed is:

1. A rim change device comprising:
a tire holding mechanism which includes an upper spindle supporting an upper rim from above and a lower spindle disposed below the upper spindle and rotatable supporting a lower rim, and holds a tire between the upper rim and the lower rim;
a rim storage in which a plurality of different types of upper rims and a plurality of different types of lower rims are stored; and
a rim carrying mechanism which is disposed between the tire holding mechanism and the rim storage,
wherein the rim carrying mechanism includes
a first post which extends in an up-down direction,
a first carrying arm which is provided on the first post in a state of being movable in the up-down direction, is configured to turn about the first post, and is configured to carry the upper rim selected from the rim storage to the upper spindle and mount the upper rim on the upper spindle,
a second carrying arm which is provided on the first post in a state of being movable in the up-down direction, is configured to turn about the first post, and is configured to carry the lower rim selected from the rim storage to the lower spindle and mount the lower rim on the lower spindle,
a second post which extends in the up-down direction and is provided at a position adjacent to the first post,
a third carrying arm which is provided on the second post in a state of being movable in the up-down direction, is configured to turn about the second post, and is configured to carry the upper rim collected from the upper spindle and store the upper rim in the rim storage, and
a fourth carrying arm which is provided in the second post in a state of being movable in the up-down direction, is configured to turn about the second post, and is configured to carry the lower rim collected from the lower spindle and store the lower rim in the rim storage,
wherein the first carrying arm is configured to carry another upper rim to the upper spindle after the upper rim is collected, by being configured to turn in a direction following the third carrying arm from a side opposite to a side on which the third carrying arm turns, and
wherein the second carrying arm is configured to carry another lower rim to the lower spindle after the lower rim is collected, by being configured to turn in a direction following the fourth carrying arm from a side opposite to a side on which the fourth carrying arm turns.

2. The rim change device according to claim 1,
wherein the rim storage stores the plurality of different types of upper rims and the plurality of different types of lower rims in the up-down direction, and
wherein the plurality of different types of lower rims are disposed below the plurality of different types of upper rims.

3. The rim change device according to claim 2,
wherein the first post and the second post are disposed to face each other in a direction orthogonal to a straight line connecting a center axis of the rim storage and center axes of the upper spindle and the lower spindle to each other.

4. The rim change device according to claim 1,
wherein the second carrying arm is disposed at a position overlapping the first carrying arm in the up-down direction,
wherein the fourth carrying arm is disposed at a position overlapping the third carrying arm in the up-down direction, and
the rim change device further comprises:
a first turning unit which is configured to turn the first carrying arm and the second carrying arm at the same timing and in the same direction;
a first elevating unit which is configured to raise or lower the first carrying arm in the up-down direction;
a second elevating unit which is configured to raise or lower the second carrying arm in the up-down direction;
a second turning unit which is configured to turn the third carrying arm and the fourth carrying arm at the same timing and in the same direction;
a third elevating unit which is configured to raise or lower the third carrying arm in the up-down direction; and
a fourth elevating unit which is configured to raise or lower the fourth carrying arm in the up-down direction.

5. The rim change device according to claim 1,
wherein each of the plurality of upper rims has a first flange portion,
wherein each of the plurality of lower rims has a second flange portion,
wherein each of the first carrying arm and the third carrying arm has a C shape and includes an upper rim support portion in which a first support groove inside which the first flange portion is placed is formed,
wherein each of the second carrying arm and the fourth carrying arm has a C shape and includes a lower rim support portion in which a second support groove inside which the second flange portion is placed is formed,
wherein the upper rim support portion of the first carrying arm is open on a side from the rim storage toward the upper spindle,
wherein the lower rim support portion of the second carrying arm is open on a side from the rim storage toward the lower spindle,
wherein the upper rim support portion of the third carrying arm is open on a side from the rim storage toward the upper spindle, and
wherein the lower rim support portion of the fourth carrying arm is open on a side from the rim storage toward the lower spindle.

6. The rim change device according to claim 5,
wherein a first gap through which the first carrying arm and the third carrying arm pass is formed between at least two of the plurality of upper rims which are stored in the rim storage and disposed in the up-down direction, and
wherein a second gap through which the second carrying arm and the fourth carrying arm pass is formed between at least two of the plurality of lower rims which are stored in the rim storage and disposed in the up-down direction.

7. The rim change device according to claim 1,
wherein the rim storage includes
a support plate which extends in the up-down direction,
a plurality of upper rim support tables which are provided on a side of the support plate facing the tire holding mechanism, are disposed at intervals in the up-down direction, and support the upper rim,
a plurality of lower rim support tables which are provided on the side of the support plate facing the tire holding mechanism, are disposed at intervals in the up-down direction, and support the lower rim, and
a turning shaft which is provided on one end of the support plate and is configured to turn the support plate.

8. A tire test device comprising:
the rim change device according to claim 1; and
a measurement unit which is configured to measure characteristics of the tire held between the upper rim and the lower rim.

9. A rim replacement method using first and second carrying arms which are provided in a first post and are configured to turn about the first post and third and fourth carrying arms which are provided in a second post and are configured turn about the second post, the method comprising:
an upper rim replacement step of moving the third carrying arm from below an upper spindle after supporting an upper rim mounted on the upper spindle by the third carrying arm, and thereafter, when the third carrying arm is turned in a direction toward a rim storage, turning and moving the first carrying arm supporting another upper rim in the rim storage to follow the turning third carrying arm and moving the other upper rim below the upper spindle; and
a lower rim replacement step of moving the fourth carrying arm from above a lower spindle after supporting a lower rim mounted on the lower spindle by the fourth carrying arm, and thereafter, when the fourth carrying arm is turned in a direction toward the rim storage, turning and moving the second carrying arm supporting another lower rim in the rim storage to follow the turning fourth carrying arm and moving the other lower rim above the lower spindle,
wherein in the upper rim replacement step, the first carrying arm is configured to carry the other upper rim below the upper spindle in conjunction with retreating of the third carrying arm supporting the upper rim from below the upper spindle, and
wherein in the lower rim replacement step, the second carrying arm is configured to carry the other lower rim above the lower spindle in conjunction with retreating of the fourth carrying arm supporting the lower rim from above the lower spindle.

10. The rim replacement method according to claim 9,
wherein the first carrying arm remains stationary near the upper spindle in a state where the first carrying arm supports the other upper rim in a stage before the third carrying arm retreats, and
wherein the second carrying arm remains stationary near the lower spindle in a state where the second carrying arm supports the other lower rim in a stage before the fourth carrying arm retreats.

11. The rim replacement method according to claim 9,
wherein the first carrying arm and the second carrying arm turn and are raised or lowered such that the first carrying arm and the second carrying arm overlap each other in an up-down direction in which the upper spindle and the lower spindle face each other, and
wherein the third carrying arm and the fourth carrying arm turn and are raised or lowered such that the third carrying arm and the fourth carrying arm overlap each other in the up-down direction.

* * * * *